(12) United States Patent
Cadieux

(10) Patent No.: US 7,594,403 B2
(45) Date of Patent: Sep. 29, 2009

(54) BLEED OFF VALVE SYSTEM

(75) Inventor: Michel Cadieux, Quebec (CA)

(73) Assignee: Rolls-Royce Power Engineering PLC, Derby (GB)

( * ) Notice: Subject to any disclaimer, the term of this patent is extended or adjusted under 35 U.S.C. 154(b) by 290 days.

(21) Appl. No.: 11/706,691

(22) Filed: Feb. 15, 2007

(65) Prior Publication Data

US 2008/0028764 A1    Feb. 7, 2008

Related U.S. Application Data

(63) Continuation of application No. PCT/US2007/001578, filed on Jan. 22, 2007.

(60) Provisional application No. 60/760,603, filed on Jan. 20, 2006.

(51) Int. Cl.
*F02C 6/04* (2006.01)

(52) U.S. Cl. .......................... 60/785; 60/782

(58) Field of Classification Search .................. 60/782, 60/785, 795
See application file for complete search history.

(56) References Cited

U.S. PATENT DOCUMENTS

| | | | |
|---|---|---|---|
| 3,584,458 A | 6/1971 | Wetzler | |
| 3,638,428 A | 2/1972 | Shipley et al. | |
| 4,344,282 A * | 8/1982 | Anders | 60/226.1 |
| 4,390,318 A | 6/1983 | Weiler | |
| 4,409,788 A | 10/1983 | Nash et al. | |
| 4,715,779 A | 12/1987 | Suciu | |
| 5,044,153 A | 9/1991 | Mouton | |
| 5,261,228 A | 11/1993 | Shuba | |
| 5,279,109 A | 1/1994 | Liu et al. | |
| 5,351,473 A * | 10/1994 | Shuba | 60/782 |
| 5,515,673 A | 5/1996 | Leclerco et al. | |
| 5,687,562 A | 11/1997 | Stewart et al. | |
| 5,775,098 A | 7/1998 | Philippona | |
| 5,845,482 A | 12/1998 | Carscallen | |
| 6,048,171 A | 4/2000 | Donnelly et al. | |
| 6,122,905 A | 9/2000 | Liu | |
| 6,161,839 A | 12/2000 | Walton et al. | |
| 6,647,708 B2 | 11/2003 | Bornhoft et al. | |
| 6,742,324 B2 | 6/2004 | Bachelder et al. | |
| 6,755,025 B2 | 6/2004 | Eleftheriou et al. | |
| 6,851,255 B2 | 2/2005 | Aitchison et al. | |
| 2004/0096315 A1 | 5/2004 | Chlus | |

OTHER PUBLICATIONS

Partial Int'l Search Rept, PCT/IB2007/001571.

* cited by examiner

*Primary Examiner*—William H Rodriguez
(74) *Attorney, Agent, or Firm*—Krieg DeVault LLP; Matthew D. Fair, Esq.

(57) ABSTRACT

A gas turbine engine system including a plurality of bleed off doors forming a portion of a conical surface in the flow path between the low pressure compressor and the intermediate pressure compressor. A plurality of actuators are coupled to a unison ring and move the unison ring in a substantially axial direction. The plurality of bleed off doors are coupled to the unison ring and move therewith.

15 Claims, 10 Drawing Sheets

BLEED OFF VALVE SYSTEM

CROSS-REFERENCE TO RELATED APPLICATIONS

The present application is a continuation of PCT Patent Application No. PCT/US07/01578 filed Jan. 22, 2007, which claims the benefit of U.S. Patent Application No. 60/760,603 filed Jan. 20, 2006, each of which is incorporated herein by reference.

FIELD OF THE INVENTION

The present invention relates generally to gas turbine engines and more specifically to bleed off valve actuation systems for utilization therewith.

BACKGROUND

Gas turbine engines are an efficient source of useful energy and have proven reliable for industrial applications and aircraft propulsion, as well as for other uses. Gas turbine engines may include an air bleed system to bleed air from the main gas path in varying amounts at part power and to respond to transient conditions. Many air bleed systems suffer from a number of limitations, and drawbacks, for example, those respecting, complexity, part count, exposure of sensitive parts to hot gas flow, and others. Thus, there remains a need for the unique and inventive bleed off valve system disclosed herein

SUMMARY

One embodiment of the present application contemplates a system comprising: a first gas turbine engine compressor; a second gas turbine engine compressor; a working fluid passageway connecting the first gas turbine engine compressor in fluid flow communication with the second gas turbine engine compressor; a plenum; a unison ring extending around the working fluid passageway; a plurality of bleed off doors defining a portion of an outer wall of the working fluid passageway and located between the compressors, the plurality of bleed off doors coupled to the unison ring and operable to open into the plenum to allow working fluid flow from the working fluid passageway to the plenum; and a plurality of actuators coupled to the unison ring and operable to move the unison ring in a linear direction and actuate the plurality of bleed off doors.

Further embodiments, forms, objects, features, advantages, aspects, and benefits of the present invention shall become apparent from the following description and drawings.

DETAILED DESCRIPTION

Figure 1:
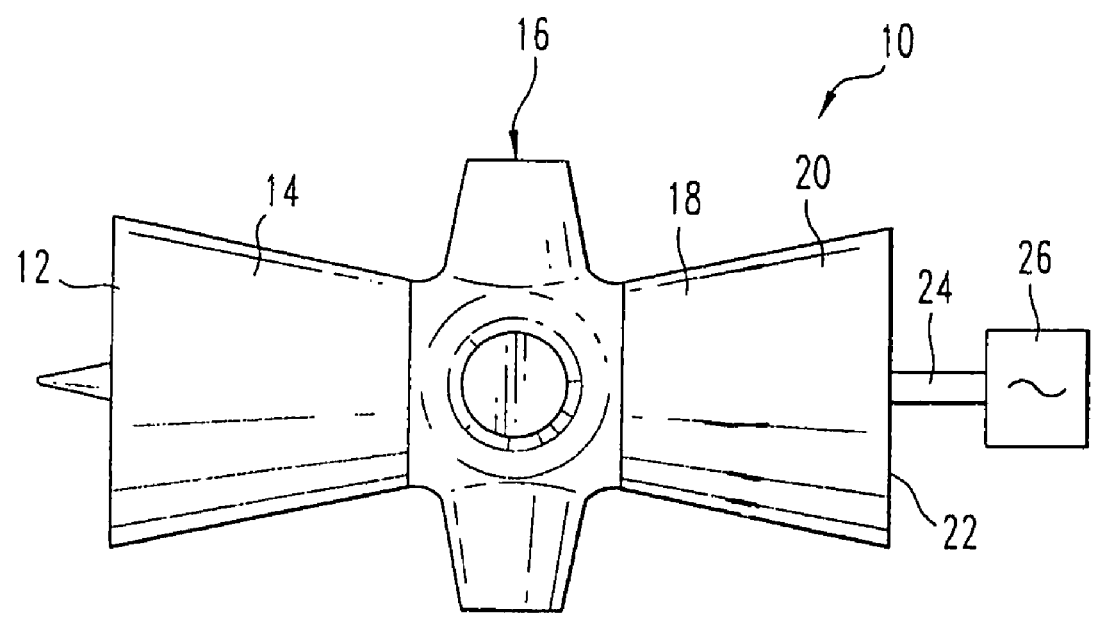
FIG. 1 is a schematic representation of one embodiment of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated an industrial gas turbine engine 10, including, an inlet 12, a compressor section 14, a combustor section 16, a turbine section 18 and an exhaust 22. A portion of the turbine section 18 is arranged to drive the compressor section 14 and a portion of the turbine section 18 drives an electrical generator 26 via a shaft 24. Furthermore, the portion of the turbine section 18 may be arranged to provide drive for other applications. A person of ordinary skill in the art will appreciate that the compressor section 14 can include one or more compressors such as a low pressure compressor, an intermediate pressure compressor and a high pressure compressor. In one form of the present application the bleed off valve system is located between the low pressure compressor and the intermediate pressure compressor.

It should be understood that industrial gas turbine engine 10 is a non-limiting embodiment and that a variety of other gas turbine engine configurations are also contemplated herein including, for example, gas turbine engines suitable for propulsion of aircraft including helicopters, airplanes, missiles, unmanned space devices and other similar devices, gas turbine engines suitable for pumping sets for oil and gas transmission lines, and as prime movers in a marine propulsion system. The operation of gas turbine engines is considered conventional and will not be discussed further as it is believed known to one of ordinary skill in the art.

With reference to FIGS. 2-10, the present inventions will be described. As is believed generally know when multiple independently rotatable compressors are utilized to pressurize a working fluid in a common flow path it is often desirable to bleed a portion of the working fluid from the common flow path. The bleeding of working fluid from the common flow path may be at conditions such as, but not limited to, part power operation, response to transient conditions, and/or prevention of a stall condition. The present application contemplates that the working fluid may be air. However, other types of working fluids are contemplated herein.

One form of the present invention contemplates an industrial gas turbine engine that requires at least a portion of the working fluid to be bled from the common working fluid flow path in varying amounts at part power and/or to respond to transient conditions. The industrial gas turbine engine may include a plurality of compressors; such as a low pressure compressor, intermediate pressure compressor and a high pressure compressor. The present application contemplates a variety of compressor sections and is not limited to a compressor section including a low pressure compressor, an intermediate pressure compressor and a high pressure compressor unless specifically stated to the contrary. In one embodiment the working fluid is bled from gas flow path between the low pressure compressor and the intermediate pressure compressor. The bleeding is accomplished through opening and closing one or more bleed doors located around the outside of the gas flow path. In one form the bleed off valves defines a plurality of bleed doors located around the outside of the gas path, and in a preferred form there are 18 doors. However, other quantities of bleed doors are contemplated herein. The present application contemplates that the doors may be uniformly or non-uniformly spaced around the flow path and may have a similar or dissimilar shape.

In one form the plurality of bleed doors define the majority of the outer wall of the gas flow path. However, the present invention is not limited to a system where the plurality of bleed doors define the majority of the outer wall of the gas flow path. When the plurality of bleed doors are opened at least a portion of the working fluid leaves the gas path and is collected in a plenum and then ducted away. In one form the plurality of bleed doors, related actuation linkages, and the actuators are located inside the plenum. In another preferred form of the present invention portions of the system such as the actuators are located external to the plenum.

In one form of the present invention, at the desired axial position of the gas turbine engine the gas flow path is decreasing in diameter to accommodate the difference in diameter from the rear of the low pressure compressor to the front of the intermediate pressure compressor. The resulted flow path shape in this position results in a substantially conical shaped surface that associates very well with a plurality of discrete bleed doors hinged at one end. The present application further contemplates that the flow path may have other shapes such as but not limited to a cylindrical shape. Further, the present invention contemplates other door and porting arrangements and is not limited to a bleed doors hinged at one end. In one alternative embodiment, the flow path defines a cylindrical gas path and the door is defined by a cylindrical sleeve that is moved axially relative to at least one port leading to the plenum.

Figure 2:
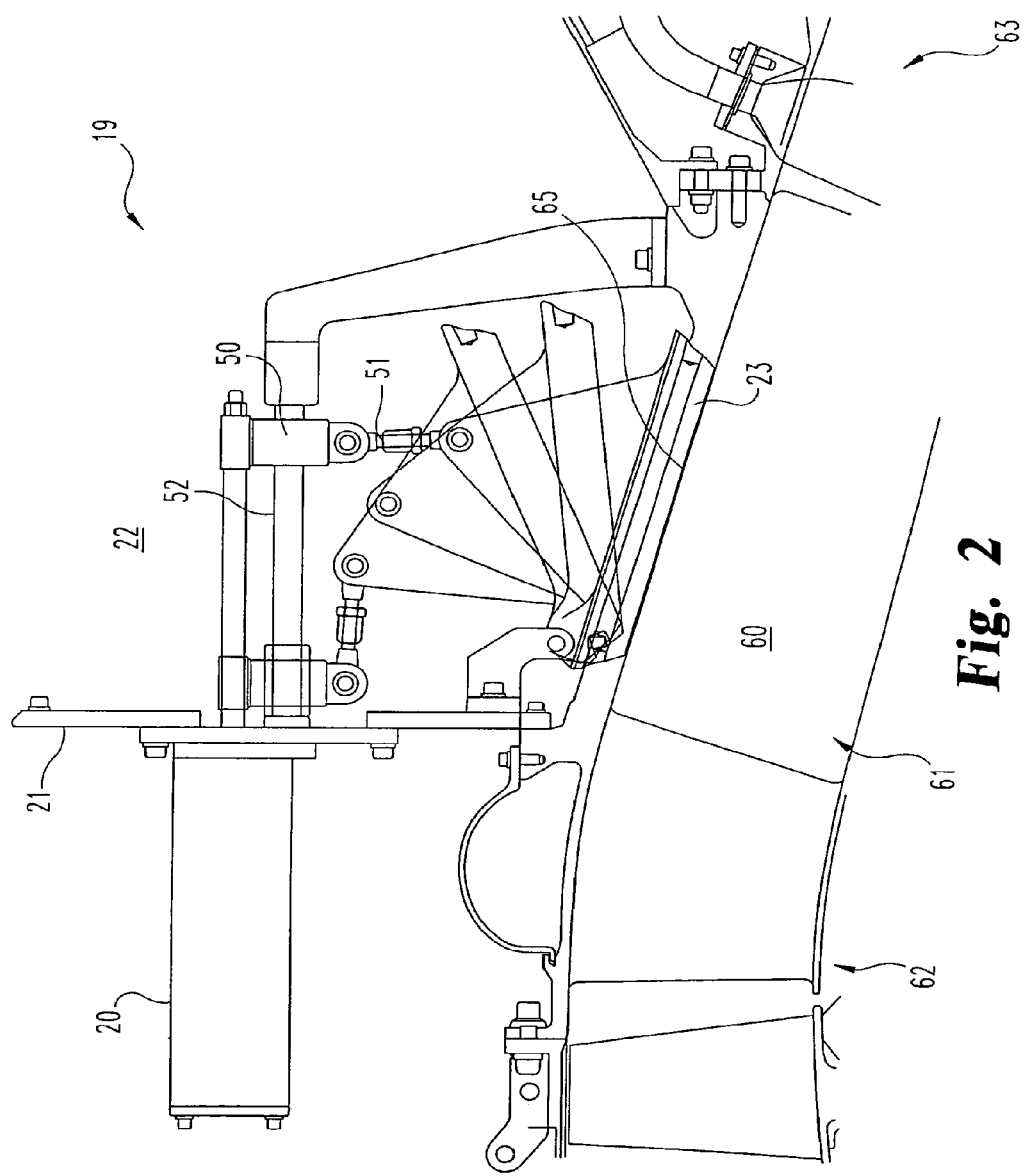
FIG. 2 is an illustrative view of one embodiment of a bleed off valve system of the present application.
Figure 3:
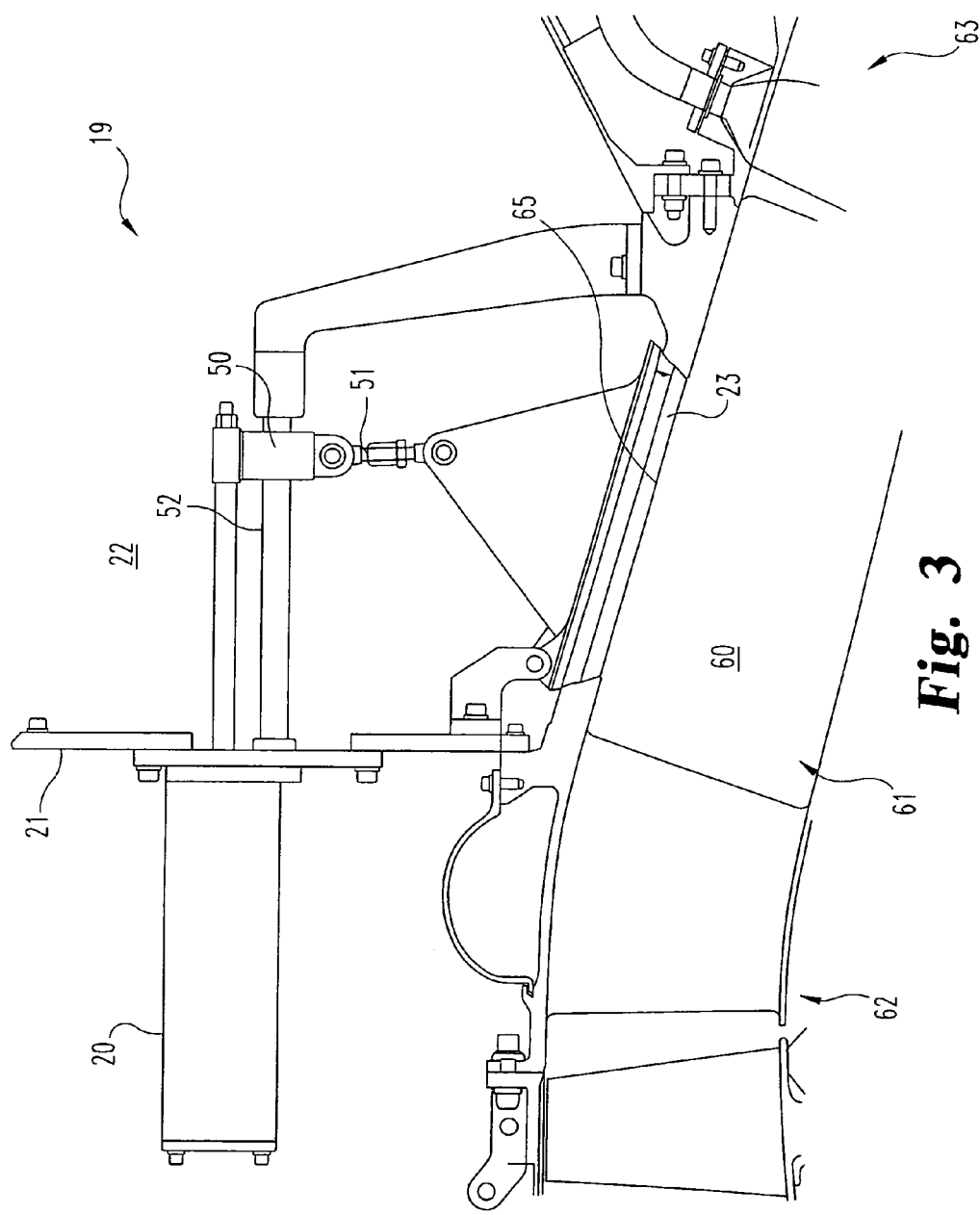
FIG. 3 is an illustrative view of the bleed off valve system of FIG. 2 with the bleed off valve doors in a closed position.
Figure 4:
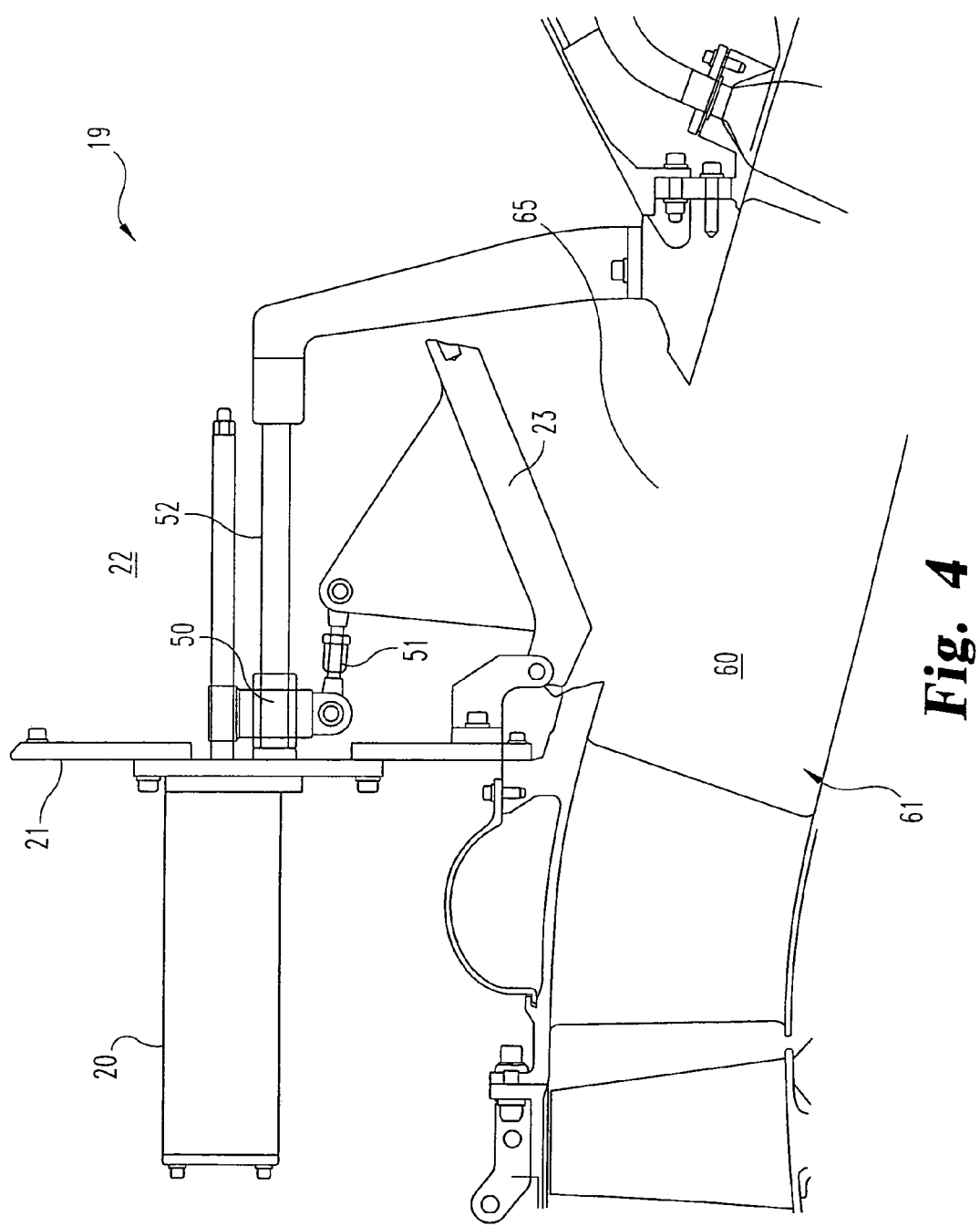
FIG. 4 is an illustrative view of the bleed off valve system of FIG. 2 with the bleed off valve doors in an open position.

With reference to FIGS. 2-4, there is depicted an illustrative view of one system 19 of the present invention. A plurality of actuators 20 are coupled to a front wall 21 and located externally of a fluid flow plenum 22. In one form the plurality of actuators 20 are disposed at equally spaced positions and are linked to each bleed door 23 to adjustable rod ends 51 via an idle arm 50 that is guided through a guide shaft 52 in an enclosed bearing shell. The actuators may be electric, pneumatic or hydraulic. In a preferred form the plurality of actuators 20 provide linear axial movement of a component within the system. In one form of the present invention the plurality of actuators 20 are operable in parallel to move the bleed doors 23 in parallel. More specifically, one form of the present invention contemplates a plurality of bleed doors 23 each having a dedicated actuator 20 for moving the respective bleed door 23 and the actuators 20 are synchronized to move the bleed doors in unison. The bleed doors 23 are moveable from a closed position illustrated in FIG. 3 to an open position illustrated in FIG. 4 and vice versa. The bleed doors 23 are moved outward from the flow path 60 to allow a portion of the working fluid to exit into a plenum 22. In one form of the present application the bleed doors 23 do not move into the flow path 60.

In one form of the present application the plurality of bleed doors 23 are located around a conical portion 61 of the flow path 60 and between the low pressure compressor section 62 and the intermediate pressure compressor section 63. The conical portion 61 of the flow path includes an outer conical surface 65 to which the plurality of bleed doors 23 engage when in a closed position.

Figure 5:
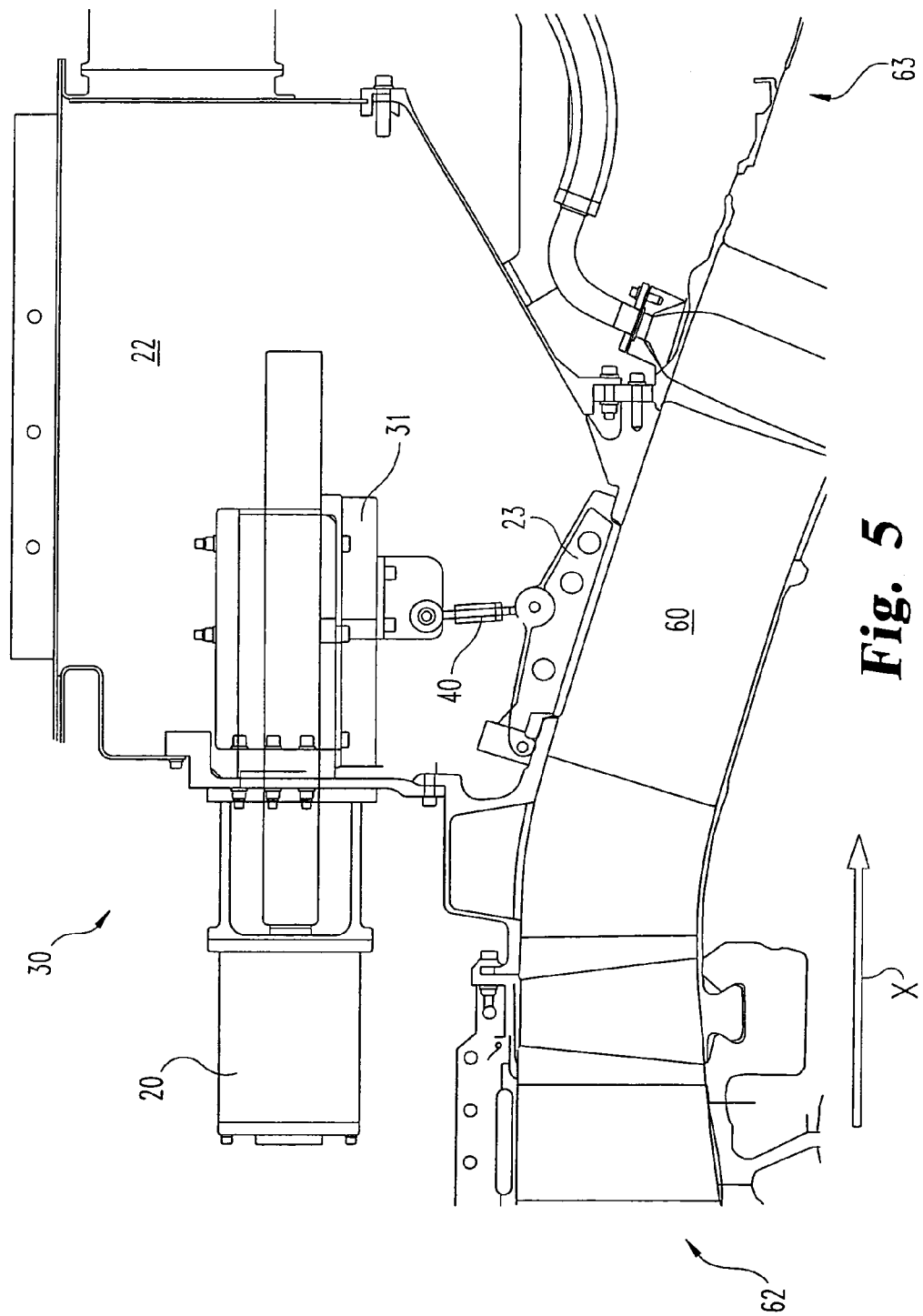
FIG. 5 is an illustrative view of another embodiment of a bleed off valve system of the present application with the bleed off valve doors in a closed position.
Figure 6:
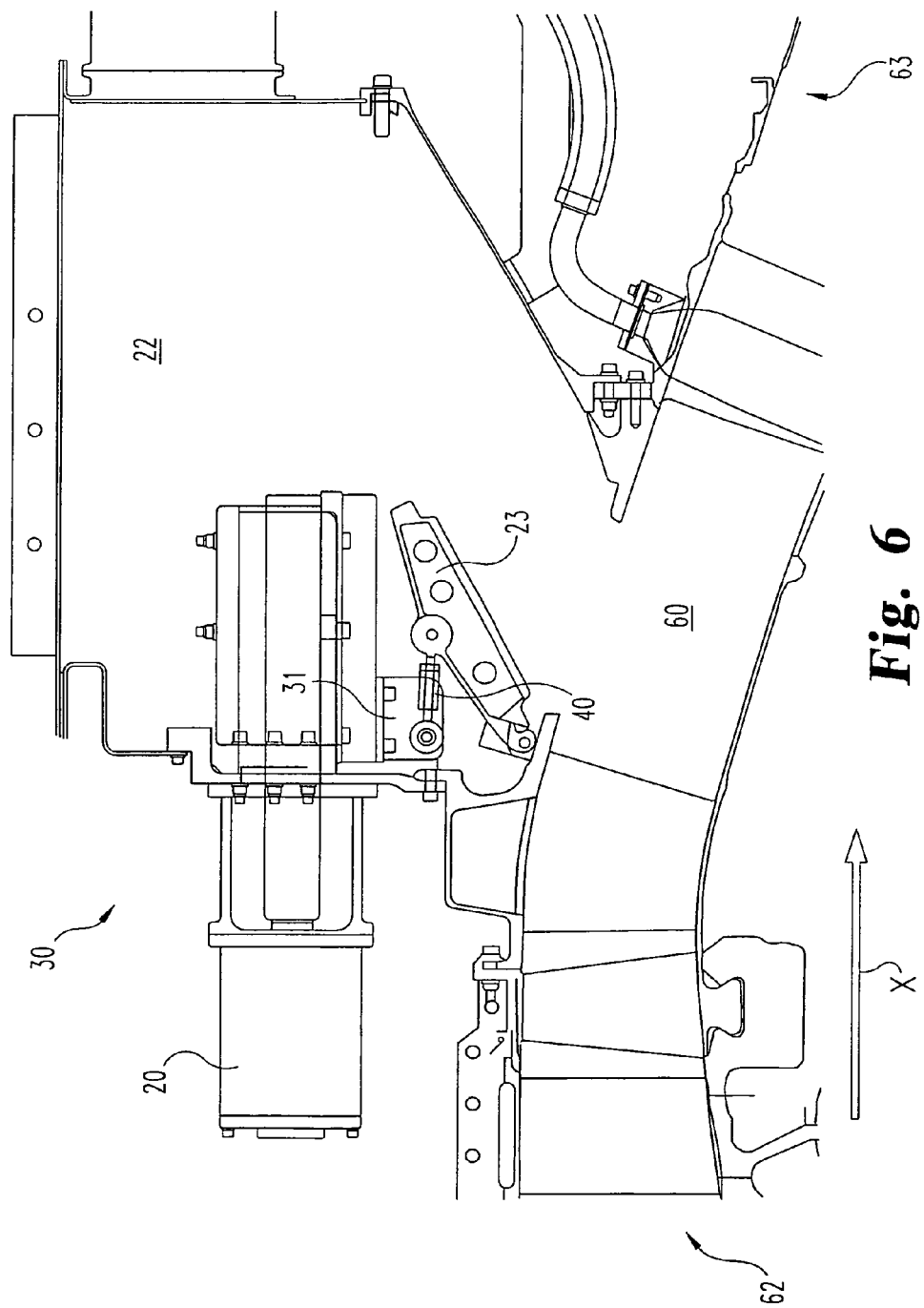
FIG. 6 is an illustrative view of the bleed off valve system of FIG. 5 with the bleed off valve doors in an open position.

With reference to FIGS. 5 and 6, there is illustrated another form of a system 30 of the present invention. The system 30 includes a unison ring 31 located within the plenum 22 and coupled between the plurality of actuators 20 and the bleed door linkages 40. In one form of the present invention there is utilized two actuators 20 coupled to the unison ring 31, and in a more preferred form there is contemplated the utilization of four actuators coupled to the unison ring 31. However, other numbers of actuators 20 are contemplated herein. The system 30 is one illustrative form of the present invention wherein the plurality of bleed doors 23 are moved together in synchronization. In one form of system 30 the bleed doors 23 are not disposed within the flow path 60. As discussed above the system 30 is disposed between the low pressure compressor 62 and the intermediate pressure compressor 63. However, other locations are contemplated herein.

The actuators 20 are coupled to the wall 21 of the plenum 22 and the unison ring 31 and are operable to move the unison ring 31 axially with a substantially linear motion. In a preferred form the unison ring 31 is moved in a linear direction. In one form the actuators 20 move the unison ring 31 in a direction substantially parallel with axis X and in a preferred form parallel with the axis X. In one embodiment of system 30 the actuators are hydraulic actuators that are preferably located outside of the plenum 22. In a preferred form each of the actuators 20 is coupled to the unison ring 31 by a self aligning coupling. The unison ring 31 is supported on a guide shaft that travels through a tandem linear (sliding) bearing unit. Further the unison ring is connected via linkages 40 to each bleed door 23.

Figure 7:
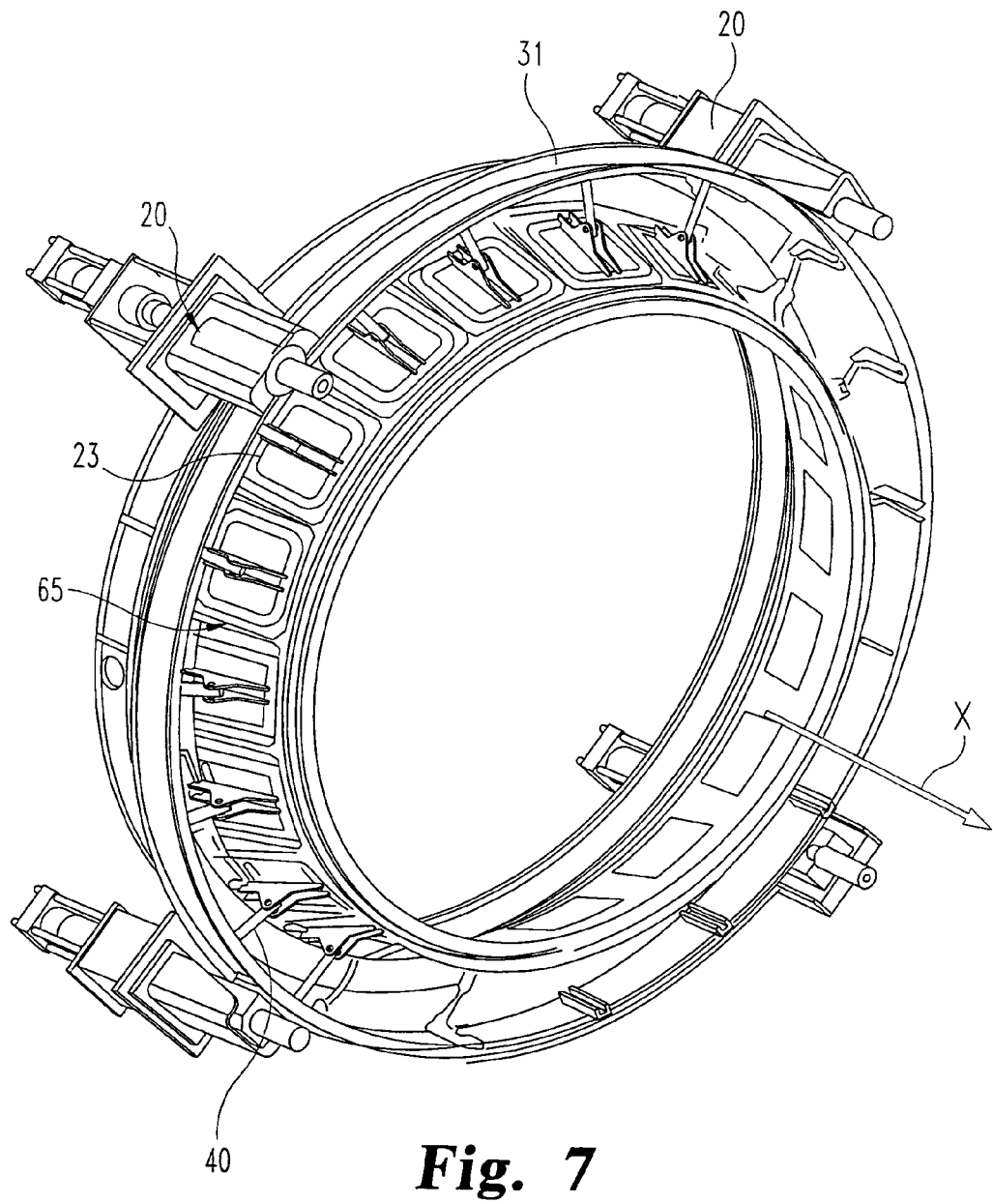
FIG. 7 is a perspective view of one embodiment of the bleed off valve system of FIG. 5.

With reference to FIG. 7, there is illustrated a perspective view of one form of the system 30 of the present invention. The plurality of bleed doors 23 is disposed around the conical surface 65 to allow fluid flow from the fluid flow path 60 to the plenum 22. The plurality of actuators 20 are coupled to the unison ring 31 and are operable to move the unison ring 31 in an axial direction parallel with axis X. The plurality of bleed doors 23 are coupled to the unison ring 31 via bleed door linkages 40.

Figure 8:
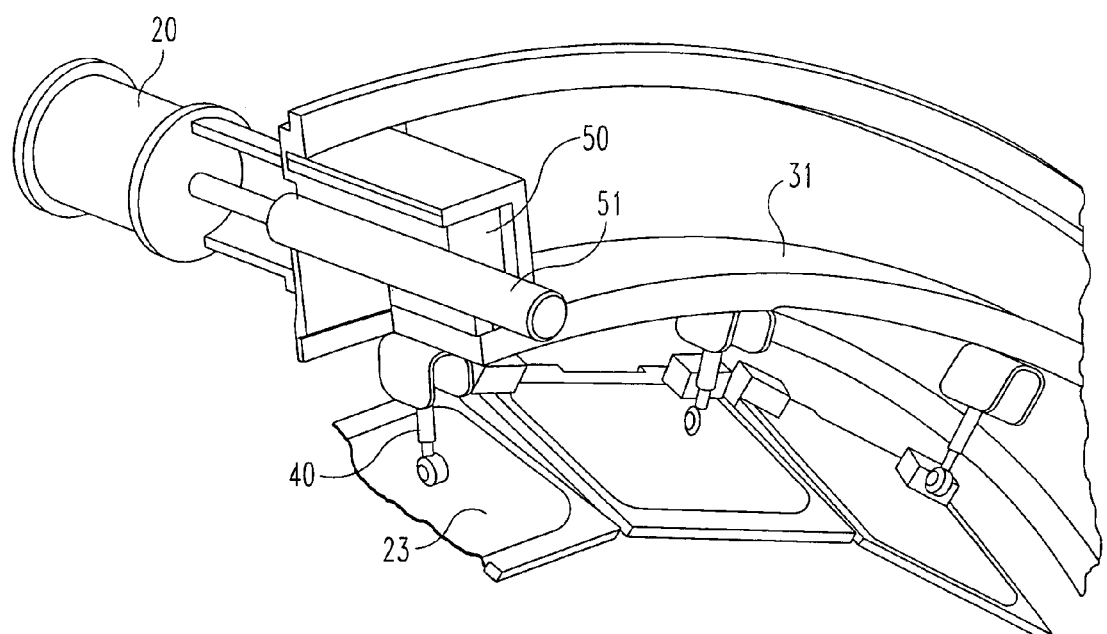
FIG. 8 is an enlarged partial view of the bleed off valve system of FIG. 7.
Figure 9:
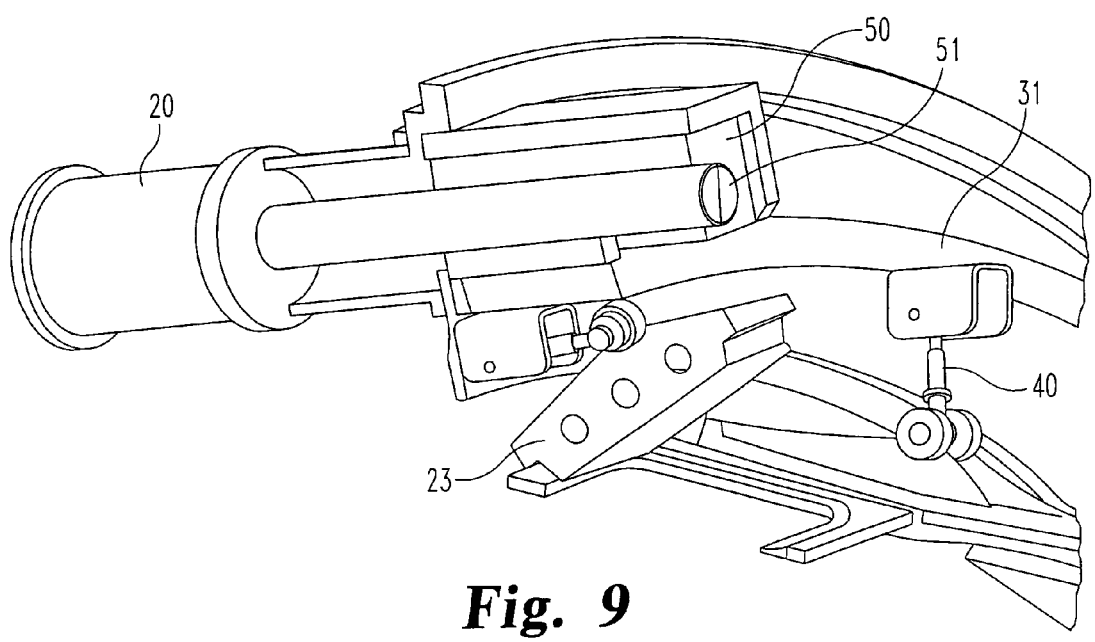
FIG. 9 is an enlarged partial view of the bleed off valve system of FIG. 7 with the bleed off valve doors in an open condition.

With reference to FIGS. 8 and 9, there is illustrated a portion of the system 30. In one form of the present application the unison ring 31 is a hoop continuous structure. The unison ring 31 distributes the loads to the plurality of doors 23 during movement of the ring. With reference to FIG. 8 there is illustrated an extended position of the actuator 20 and in FIG. 9 there is illustrated a retracted position of the actuator 20. A bearing block 50 supports the guide rod 51 and allows linear movement. In a preferred form of the invention the actuators 20 are coupled to a reinforced wall of the plenum.

Figure 10:
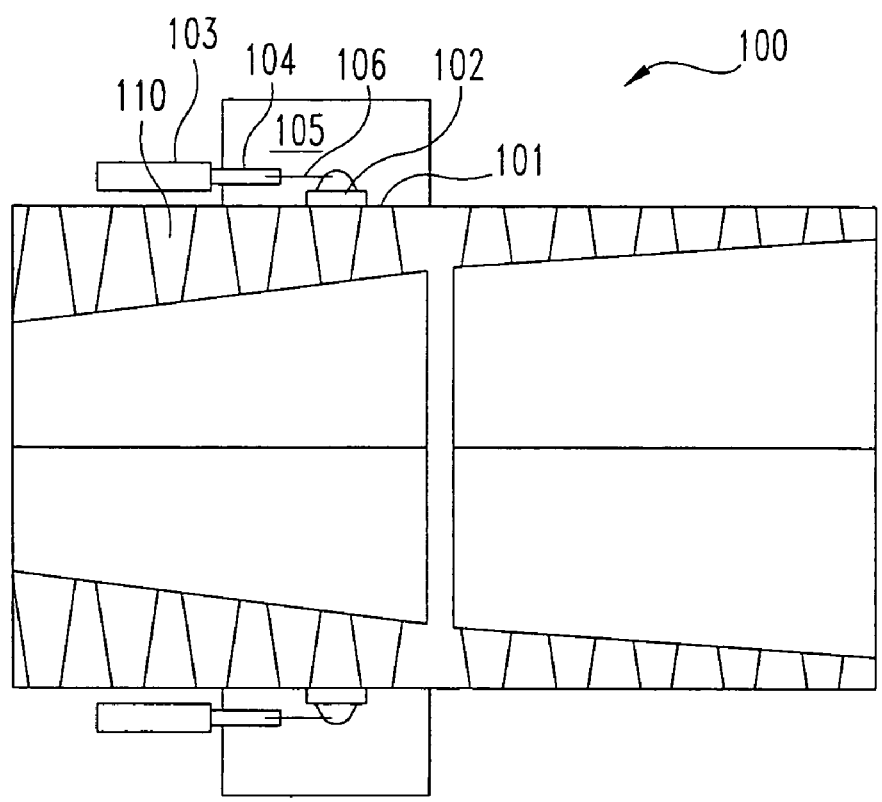
FIG. 10 is an illustrative view of a bleed off valve system according to another embodiment of the present application.

With reference to FIG. 10, there is illustrated an alternative system 100 that is utilized with a flow path 110 having a cylindrical outer gas path wall 101. A cylindrical sleeve valve 102 is actuated by an actuator 103 located external to the plenum 105. However, the present application also contemplates a system where the actuator(s) 103 are located within the plenum 105. In one form the cylindrical sleeve valve 102 is connected to the unison ring 104 by linkage 106. In another form of the present invention the cylindrical sleeve valve 102 the unison ring 104 and linkage 106 are combined into one ring. The cylindrical sleeve 102 is moved in an axial direction to open and close the fluid flow path into the plenum 105.

The present invention further contemplates that the bleed of the working fluid can be taken between stages as an alternative to between compressors. Additionally in some applications the plenum may be unnecessary, in which case the actuator would be supported from a dedicated support structure, which may optionally have the function of acting as a heat shield to protect the actuator from the bleed of the working fluid. As discussed above forms of the present invention may be applicable to other technology areas than gas turbine engines. For example, other types of systems requiring bleeding of fluid from inside a cylindrical/conical duct or chamber could use the embodiments described above.

In one form of the present invention the motion of the unison ring is a purely linear motion that translates to a rotary motion of the plurality of bleed doors. The unison ring's linear or axial motion is applicable for installation in a wide variety of environments that requires annulus fluid or gas bleed off out of the gas path and/or package. In one form the system allows multi-door linkage attachment and can be activated with a minimum of two actuators. Further, the unison ring allows for synchronization of the plurality of bleed off valves and the unison ring moves axially with the mass load of the plurality of doors.

One form of the present application contemplates a system comprising: a first compressor; a second compressor; a passageway connecting said first compressor in fluid flow communication with said second compressor; a unison ring; a plurality of bleed off doors defining a portion of said passageway and located between said compressors, said plurality of bleed off doors coupled to said unison ring; and at least one actuator operable to move said unison ring in a linear direction and actuate said plurality of bleed off doors. Another form of the present invention contemplates said at least one actuator defines a plurality of actuators. Yet another form of the present invention contemplates the system further includes a plenum located around said plurality of bleed off valves, and wherein the actuation of said plurality of bleed off doors to a non closed position allows a working fluid to pass from said passageway and into said plenum. Yet another form of the present invention contemplates said at least one actuator is located outside of said plenum. Yet another form of the present invention contemplates said plurality of bleed off doors move in unison. Yet another form of the present invention contemplates a system wherein each of said plurality of bleed off doors is connected to said unison ring by an attachment linkage; wherein said at least one actuator defines a plurality of actuators; which further includes a plenum located around said plurality of bleed off doors, and wherein the actuation of said plurality of bleed off doors to a non closed position allows a working fluid to pass from said passageway and into said plenum; wherein said at plurality of actuators is located outside of said plenum; and wherein said plurality of bleed off doors move in unison. Yet another form of the present invention contemplates said portion of the passageway has a substantially conical outer shape.

Another form of the present invention contemplates a system comprising: a first compressor; a second compressor; a passageway connecting said first compressor in fluid flow communication with said second compressor; at least one valve forming at least a portion of said passageway; and actuator means for controlling fluid flow through said at least one valve.

In another form of the present invention there is contemplated a system comprising: a gas turbine engine including a first compressor and a second compressor; a passageway connecting said first compressor in fluid flow communication with said second compressor; a plurality of bleed off valves defining a portion of said passageway and located between said compressors; and a plurality of linear actuators, one of said plurality of linear actuators is coupled to each of said plurality of bleed off valves and operable to move said valve between and an open state and a closed state.

In another form of the present invention there is contemplated a method for bleeding a working fluid from a gas turbine engine, comprising: compressing the working fluid in a first compressor; flowing the working fluid from the first compressor through a passageway towards a second compressor; moving a unison ring linearly to open a plurality of bleed off doors forming a portion of the passageway after the first compressor; and passing at a portion of the working fluid through the opened bleed off doors.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. A system comprising:
   a first gas turbine engine compressor;
   a second gas turbine engine compressor;
   a working fluid passageway connecting said first gas turbine engine compressor in fluid flow communication with said second gas turbine engine compressor;
   a plenum;
   a unison ring extending around said working fluid passageway;
   a plurality of bleed off doors defining a portion of an outer wall of said working fluid passageway and located between said compressors, said plurality of bleed off doors coupled to said unison ring and operable to open into the plenum to allow working fluid flow from said working fluid passageway into said plenum; and
   a plurality of actuators located outside of said plenum and coupled to said unison ring and operable to move the unison ring in a linear direction and actuate said plurality of bleed off doors.

2. The system of claim 1, wherein said outer wall has a substantially conical shaped outer surface.

3. The system of claim 1, wherein said plurality of bleed off doors are not moveable into said working fluid passageway.

4. The system of claim 1, wherein said plurality of bleed off doors move in unison.

5. The system of claim 1, wherein each of said plurality of bleed off doors is connected to said unison ring by an attachment linkage;
   wherein said plurality of bleed off doors move in unison;
   wherein said outer wall has a substantially conical shaped outer surface; and
   wherein said plurality of bleed off doors are not moveable into said working fluid passageway.

6. The system of claim 5, wherein said first compressor is a low pressure compressor and said second compressor is an intermediate compressor.

7. A gas turbine engine system comprising:
- a low pressure compressor;
- an intermediate pressure compressor;
- a main working fluid passageway connecting said low pressure compressor in fluid flow communication with said intermediate pressure compressor;
- at least one bleed door forming a portion of an outer wall of said main working fluid passageway;
- a fluid flow plenum in flow communication with said at least one bleed door; and
- means for controlling movement of said at least one bleed door to control fluid flow from said main working fluid passageway, said means for controlling movement includes an actuator located outside of said plenum.

8. The gas turbine engine system of claim 7, wherein said outer wall has a conical shaped surface portion; and
- wherein said portion is defined in said conical shaped surface portion.

9. A gas turbine engine system of claim 7, wherein said at least one bleed door defines a plurality of bleed doors; and
- said plurality of bleed doors are not moveable into said main working fluid passageway.

10. A gas turbine engine system of claim 7,
- wherein said at least one bleed door defines a plurality of bleed doors;
- wherein said means for controlling movement includes a plurality of actuators located outside of said plenum; and
- wherein said plurality of bleed doors move in unison.

11. A gas turbine engine system of claim 10, which further includes a unison ring operable to move the plurality of bleed doors in unison.

12. A gas turbine engine system of claim 11, which further includes an actuation linkage coupling the unison ring to the plurality of bleed doors.

13. A system comprising:
- a gas turbine engine including a low pressure compressor and an intermediate pressure compressor;
- a main working fluid passageway connecting said low pressure compressor in fluid flow communication with said intermediate pressure compressor;
- a plurality of circumferentially spaced bleed off valves defining a conically shaped portion of an outer wall of said passageway and located between said compressors;
- a bleed off volume in fluid flow communication with the main working fluid passageway via the plurality of circumferentially spaced bleed off valves;
- a unison ring disposed outward of said main working fluid passageway and connected to said plurality of bleed off valves; and
- a plurality of linear actuators coupled to a static member of said gas turbine engine and said unison ring, said plurality of linear actuators coupled to a structure of the gas turbine engine outside of the bleed off volume and operable to move said unison ring in an axial direction and change the mode of said plurality of bleed off valves between an open state and a closed state without said plurality of bleed off valves extending into said main working fluid passageway.

14. The system of claim 13, wherein each of said plurality of bleed off valves is connected to a hinge located so that when said plurality of bleed off doors are opened they rotate in a counter-clockwise direction and when said plurality of bleed off valves close they rotate in a clockwise direction.

15. The system of claim 13, wherein said plurality of actuators defines four actuators and said plurality of bleed off doors defines 18 doors.

* * * * *